(12) United States Patent
Pal et al.

(10) Patent No.: US 10,242,793 B2
(45) Date of Patent: Mar. 26, 2019

(54) ROLLED INDUCTOR WITH THERMAL POTTANT

(71) Applicant: Hamilton Sundstrand Corporation, Windsor Locks, CT (US)

(72) Inventors: Debabrata Pal, Hoffman Estates, IL (US); John Horowy, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 147 days.

(21) Appl. No.: 15/291,877

(22) Filed: Oct. 12, 2016

(65) Prior Publication Data

US 2017/0032889 A1 Feb. 2, 2017

Related U.S. Application Data

(62) Division of application No. 14/146,834, filed on Jan. 3, 2014, now Pat. No. 9,496,085.

(51) Int. Cl.

| | | |
|---|---|---|
| *H01F 7/06* | (2006.01) |
| *H01F 27/32* | (2006.01) |
| *H01F 17/06* | (2006.01) |
| *B33Y 10/00* | (2015.01) |
| *H01F 27/02* | (2006.01) |
| *H01F 27/22* | (2006.01) |
| *H01F 41/00* | (2006.01) |
| *H01F 41/08* | (2006.01) |
| *H01F 27/24* | (2006.01) |
| *H01F 27/28* | (2006.01) |
| *B33Y 80/00* | (2015.01) |

(52) U.S. Cl.
CPC ............ *H01F 27/324* (2013.01); *B33Y 10/00* (2014.12); *H01F 17/062* (2013.01); *H01F 27/022* (2013.01); *H01F 27/22* (2013.01); *H01F 27/24* (2013.01); *H01F 27/2823* (2013.01); *H01F 41/005* (2013.01); *H01F 41/08* (2013.01); *B33Y 80/00* (2014.12); *Y10T 29/49071* (2015.01); *Y10T 29/49073* (2015.01)

(58) Field of Classification Search
CPC ....... B33Y 10/00; B33Y 80/00; H01F 27/022; H01F 27/22; H01F 27/24; H01F 27/2823; H01F 27/324; H01F 41/005; H01F 41/08; H01F 17/062
See application file for complete search history.

(56) References Cited

U.S. PATENT DOCUMENTS

| | | | |
|---|---|---|---|
| 2,382,857 A | * | 8/1945 | Camilli .................. H01F 27/25 264/272.19 |
| 3,465,273 A | | 9/1969 | Brock |
| 5,165,162 A | | 11/1992 | Charles |
| 5,214,403 A | | 5/1993 | Bogaerts et al. |
| 5,252,883 A | | 10/1993 | Kondo |
| 6,232,701 B1 | | 5/2001 | Schuh et al. |
| 6,285,116 B1 | | 9/2001 | Murai et al. |
| 6,428,644 B1 | | 8/2002 | Ohno et al. |
| 6,713,162 B2 | | 3/2004 | Takaya et al. |

(Continued)

*Primary Examiner* — Paul D Kim
(74) *Attorney, Agent, or Firm* — Kinney & Lange, P.A.

(57) ABSTRACT

An apparatus includes a substrate layer formed from a pottant material that extends longitudinally in an unwound state. Cores are spaced longitudinally along the substrate layer and joined to the substrate at a first surface. The apparatus further includes pottant segments joined to the cores at a second surface opposite the first surface.

11 Claims, 10 Drawing Sheets

(56) References Cited

U.S. PATENT DOCUMENTS

| | | |
|---|---|---|
| 6,808,642 B2 | 10/2004 | Takaya et al. |
| 7,230,316 B2 | 6/2007 | Yamazaki et al. |
| 8,034,417 B2 | 10/2011 | Fukaya et al. |
| 8,154,372 B2 | 4/2012 | Feng et al. |
| 8,773,839 B2 | 7/2014 | Yamashita et al. |
| 8,988,854 B1 | 3/2015 | Zenzai |
| 2002/0132898 A1 | 9/2002 | Takaya et al. |
| 2003/0030994 A1 | 2/2003 | Takaya et al. |
| 2006/0158826 A1 | 7/2006 | Tokuoka et al. |
| 2006/0266983 A1 | 11/2006 | Suzuki et al. |
| 2009/0146769 A1 | 6/2009 | Feng et al. |

* cited by examiner

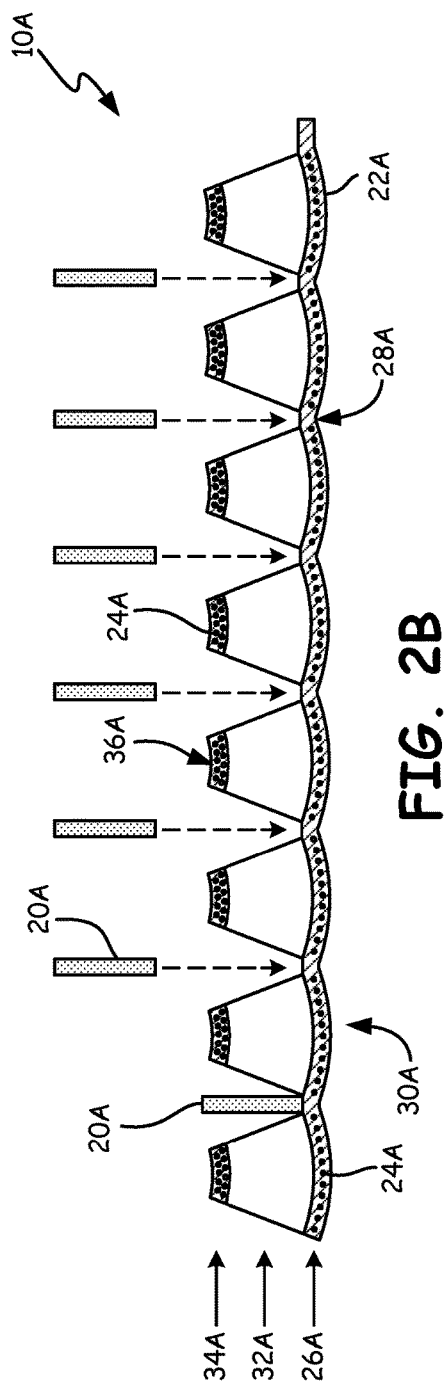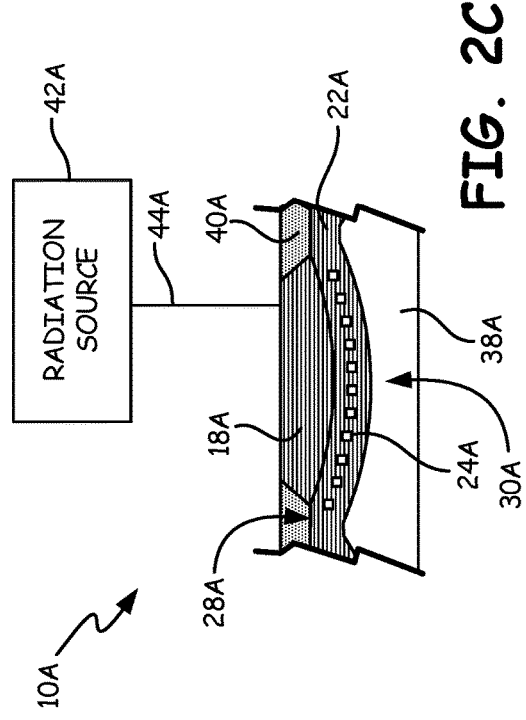

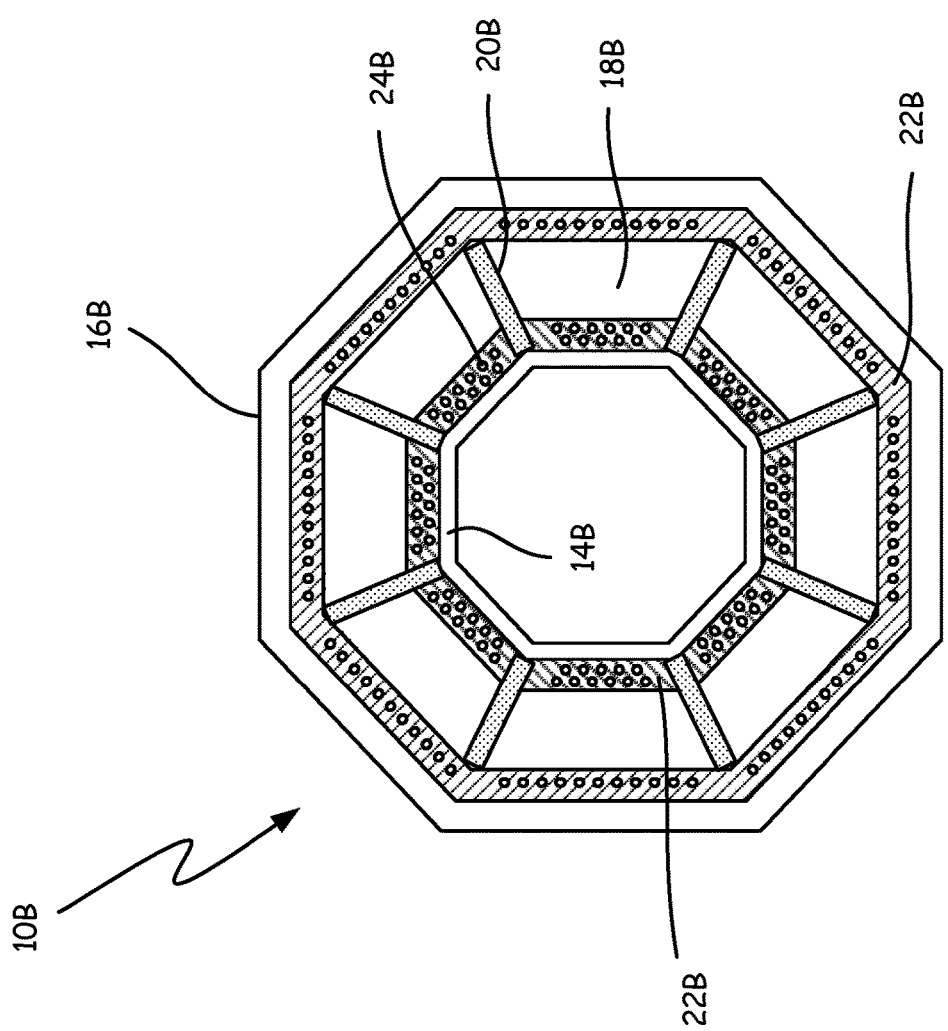

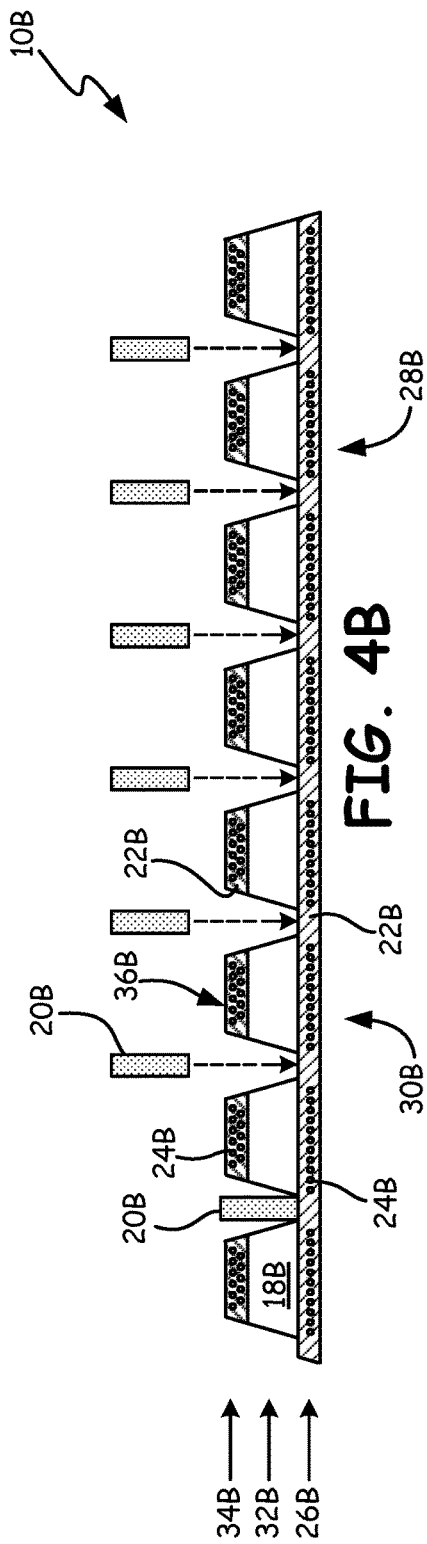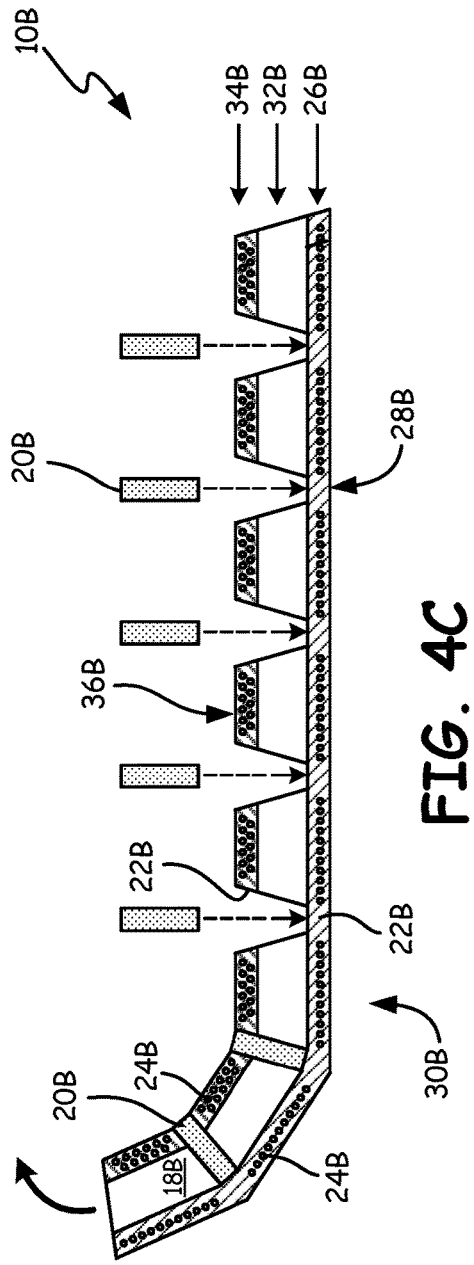

ROLLED INDUCTOR WITH THERMAL POTTANT

CROSS-REFERENCE TO RELATED APPLICATION(S)

This divisional application claims priority from application Ser. No. 14/146,834, filed Jan. 3, 2014, now U.S. Pat. No. 9,496,085, entitled METHOD OF MANUFACTURING AN INDUCTOR COIL, which is hereby incorporated by reference.

BACKGROUND

Inductors are known in the art, and are used to resist against changes in current through the coil. Inductors typically include a coil of conductive material wrapped around a magnetic core. Often, such cores are formed in a closed loop. Known inductors include coils that are wrapped manually, such as by a winding machine. Typically, the inductor's magnetic core and windings are placed between an outer wall and an inner wall.

In some applications, inductors dissipate significant quantities of heat. Because of this, known inductors are potted in heat dissipating materials. The pottant is typically poured between the inner wall and the outer wall to surround the windings and to provide environmental, thermal, and structural support to the cores and windings. Pottants must have a high degree of plasticity to fully fill the cavity between the windings and the outer casing when poured. Furthermore, the pottant selected should have as high of a coefficient of thermal transfer as possible, in order to maximize heat transfer to the outer casing.

Known pottants attempt to provide both desired rheological attributes (i.e., high plasticity/flowability for pouring) as well as high coefficients of thermal transfer.

SUMMARY

An apparatus includes a substrate layer formed from a pottant material that extends longitudinally in an unwound state. Cores are spaced longitudinally along the substrate layer and joined to the substrate at a first surface. The apparatus further includes pottant segments joined to the cores at a second surface opposite the first surface.

Another apparatus includes cores in which each core forms an annular sector that is wrapped with windings. A preformed substrate layer formed from pottant material extends longitudinally in an unwound state and circumscribes the cores in a wound state. The substrate layer further includes recesses corresponding to one of the windings along a radially outer surface of one of the cores.

BRIEF DESCRIPTION OF THE DRAWINGS

FIG. 2B is a modified view of the toroidal inductor of FIG. 2A illustrating the insertion of a gap filler.

FIG. 2C is a cross-sectional view of an additive manufacturing process for manufacturing a toroidal inductor core.

FIG. 4A is a cross-sectional view of the octagonal inductor of FIG. 3 taken along line 4A-4A.

FIG. 4B is an exploded view illustrating the insertion of gap fillers into an unwrapped octagonal inductor.

FIG. 4C illustrates the wrapping of the octagonal inductor.

DETAILED DESCRIPTION

An inductor is created by forming cores with windings in a flat layer along a substrate of a pottant material with a high thermal conductivity, then wrapping the substrate and cores into a loop. By forming the substrate and cores in layers, for example by additive manufacturing, windings can be built into a high thermal conductivity pottant surrounding the cores. The high thermal conductivity pottant completely surrounds the windings, and can be made of a material that has a high thermal conductivity without consideration of the material's plasticity or flowability.

Figure 1:
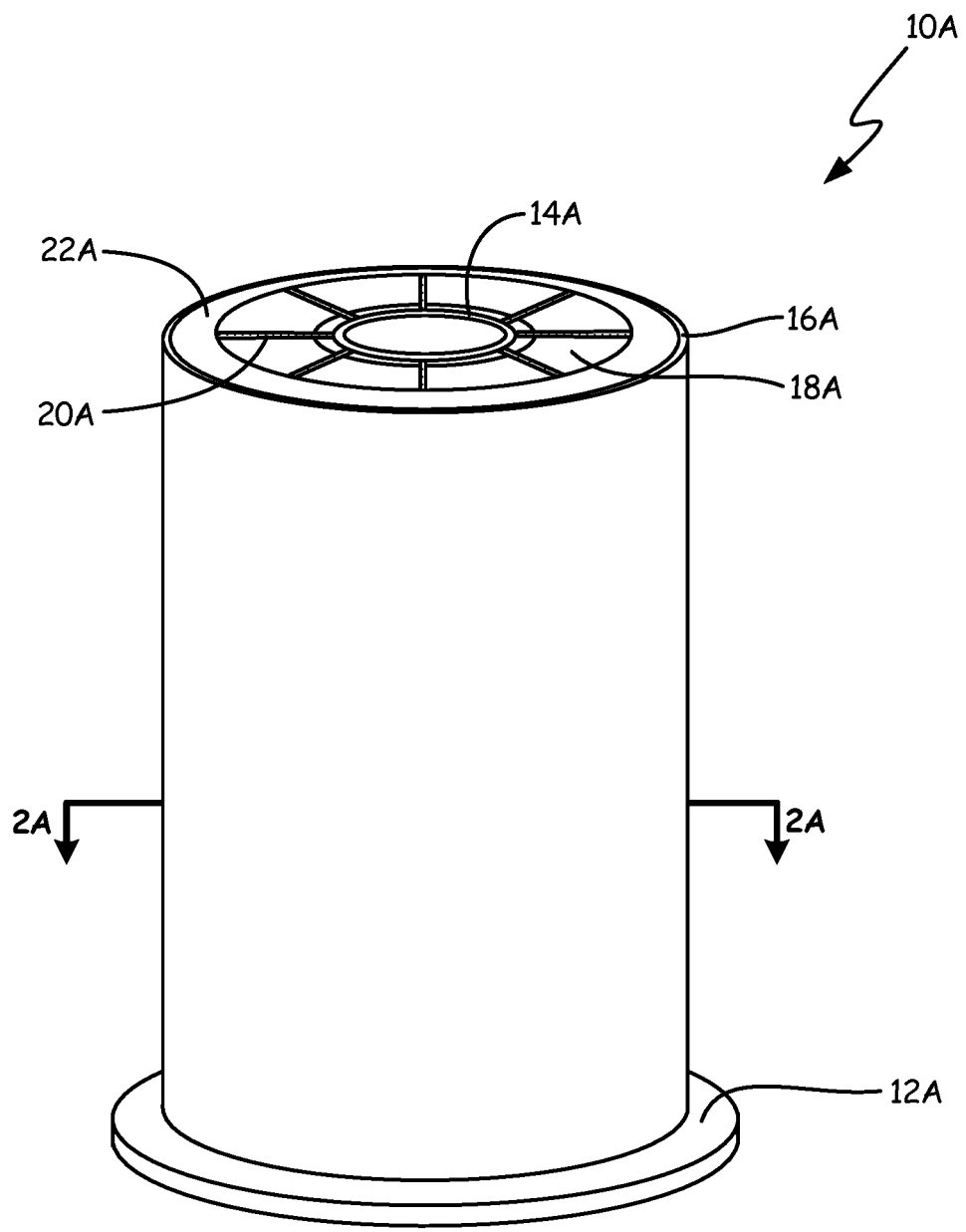
FIG. 1 is a perspective view of a toroidal inductor that is additively manufactured.

FIG. 1 is a perspective view of toroidal inductor 10A. Toroidal inductor 10A includes base 12A, inner wall 14A, outer wall 16A, a series of eight cores 18A, eight gap fillers 20A, and pottant 22A.

Base 12A is a structural portion of toroidal inductor 10A. In some embodiments, base 12A may include mounting hardware configured to attach toroidal inductor 10A to adjacent structures, such as heat sinks or a housing. Inner wall 14A and outer wall 16A are additional structural portions of toroidal inductor 10A. Inner wall 14A and outer wall 16A are configured to house cores 18A, gap fillers 20A, and pottant 22A. Inner wall 14A and outer wall 16A may be configured to dissipate heat, either directly or through thermal coupling with a heat sink.

Inner wall 14A and outer wall 16A sit on base 12A. Cores 18A are arranged in the region defined between base 12A, inner wall 14A, and outer wall 16A. Gap fillers 20A are arranged between each adjacent pair of cores 18A. Pottant material 22A is arranged between cores 18A and inner wall 14A, to completely separate cores 18A from inner wall 14A. Pottant material 22A is further arranged between cores 18A and outer wall 16A, to completely separate cores 18A and gap fillers 20A from outer wall 16A.

Figure 2A:
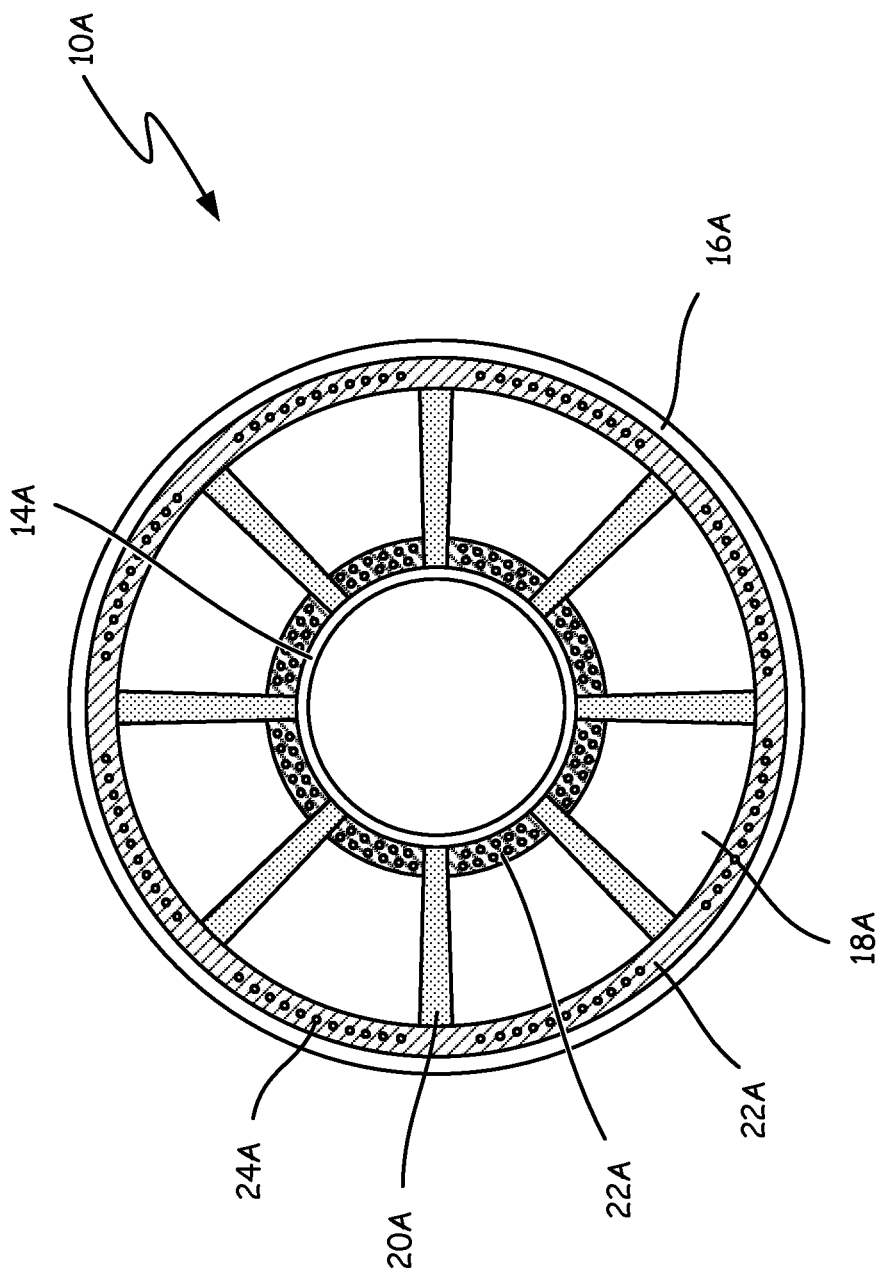
FIG. 2A is a cross-sectional view of the toroidal inductor of FIG. 1 taken along 2A-2A.

Toroidal inductor 10A has eight cores 18A, each of which is circumscribed by a plurality of windings 24A (FIGS. 2A-2C). In some embodiments, subsets of cores 18A may be associated with each of several phases. Toroidal inductor 10A may be driven by two- or three-phase power, for example, each of which would drive the windings surrounding a subset of cores 18A. Gap fillers 20A are arranged between each of cores 18A to electrically and magnetically separate the windings 24A (FIGS. 2A-2C) surrounding each of cores 18A. Gap fillers 20A are made of a dielectric material.

Pottant 22A completely fills the region between cores 18A and inner and outer walls 14A and 16A, respectively. Windings 24A are encapsulated by pottant 22A, as shown in more detail with respect to FIGS. 2A-2C. Pottant 22A facilitates heat transfer from cores 18A and windings 24A (FIGS. 2A-2C) to inner wall 14A and outer wall 16A, where it may be dissipated. Pottant 22A has a high thermal conductivity, exceeding 17 W/m-K.

FIG. 2A is a cross-sectional view of toroidal inductor 10A of FIG. 1A, taken along 2A-2A. FIG. 2A illustrates inner wall 14A, outer wall 16A, cores 18A, gap fillers 20A, and pottant 22A, as previously described with respect to FIG. 1A. Furthermore, FIG. 2A illustrates windings 24A embedded within pottant 22A. As shown in FIG. 2A, eleven windings 24A pass through pottant 22A radially outward of core 18A, and eleven windings 24A pass through pottant 22A radially outward of core 18A.

Windings 24A are electrically interconnected; for example, all eleven windings 24A associated with each core 18A are electrically connected. Windings 24A form coils around each of cores 18A, such that when electric current is driven through windings 24A, a magnetic field is generated through cores 18A. Windings 24A associated with each of cores 18A may be either electrically isolated or connected from one another. For example, in some embodiments, multiple phases of electric current are each associated with a subset of cores 18A. In other embodiments, for example those driven by a single-phase DC voltage source, all of windings 24A may be electrically interconnected.

As shown in FIG. 2A, windings 24A are circumferentially evenly spaced, radially outward of cores 18A. Windings 24A are staggered radially into two evenly spaced circumferential rows radially inward of cores 18A. In other embodiments, various other configurations of windings 24A are possible. It is often desirable to disperse windings 24A throughout pottant 22A such that heat generated as a result of driving current through windings 24A is transferred efficiently to pottant 22A.

FIG. 2B is a modified view of toroidal inductor 10A. Toroidal inductor 10A of FIG. 2B includes substantially the same components as those previously described. However, in FIG. 2B, inner wall 14A and outer wall 16A have been omitted to illustrate toroidal inductor 10A in its unwrapped state. FIG. 2B illustrates a layerwise construction of toroidal inductor 10A.

Toroidal inductor 10A can be formed in an unwrapped condition. Toroidal inductor 10A of FIG. 2B includes the same components as previously described, and further illustrates substrate layer 26A (including flat portions 28A and arcs 30A), core layer 32A, and inner layer 34A (comprised of eight segments 36A) prior to being wound into a closed loop.

Substrate layer 26A is a series of eight arcs 30A comprised primarily of pottant material 22A. Each of the arcs 30A further includes eleven evenly spaced windings 24A. Between each of the arcs 30A is a flat section 28A. Core layer 32A is formed adjacent to substrate layer 26A. Core layer 32A includes eight cores 18A, each of which are disposed adjacent to one of arcs 30A. Flat sections 28A are left uncovered by cores 18A. Inner layer 34A is formed adjacent to core layer 32A and, like substrate layer 26A, is comprised of windings 24A dispersed amidst pottant material 22A. Inner layer 34A comprises eight separate segments 36A of pottant 22A, each including eleven windings 24A. Each segment 36A of inner layer 34A is disconnected from the other, and each segment 36A is arranged on an opposite distal end of one of cores 18A from substrate layer 26A.

Gap filler 20A is shown being inserted between two segments 36A towards a flat section 28A of substrate layer 26A. Gap fillers 20A are inserted between each segment 36A and divide adjacent cores 18A and adjacent segments 36A. When gap fillers 20A have been inserted between each of cores 18A, toroidal inductor 10A can be wrapped from its unwound state (as shown in FIG. 2B) into a loop and inserted between inner wall 14A and outer wall 16A (as shown in FIG. 2A).

FIG. 2C is a cross-sectional view of toroidal inductor 10A showing one core 18A being constructed via an additive manufacturing process. Many varieties of additive manufacturing are known to those of skill in the art, including direct metal laser sintering, laser powder sintering, e-beam melting, and laser-object manufacturing, and it is unnecessary to explain these processes in detail.

It is relatively simple to additively manufacture windings 24A within pottant 22A by additively manufacturing those components. As shown in FIG. 2C, core 18A, pottant 22A, and windings 24A are additively manufactured. Strata of additively manufactured layers are visible throughout core 18A, pottant 22A, and windings 24A. Pottant 22A is built up on base 38A, which is contoured to generate a desired geometry of pottant 22A such that it will nest inside of outer wall 16A (FIG. 2A). Windings 24A are built in to pottant 22A in a desired orientation. Core 18A is additively manufactured adjacent to pottant 22A.

Each of cores 18A, pottant 22A, and windings 24A are additively manufactured by depositing pulverant material 40A in layers, then selectively sintering portions of those layers. Radiation source 42A produces a radiation beam 44A, which is directed towards portions of pulverant material 40A to solidify those portions and form toroidal inductor 10A. Because core 18A, pottant 22A, and windings 24A are comprised of different materials, pulverant material 40A may be comprised of different materials at different locations. For example, pulverant material 40A may be comprised of a high thermal conductivity material to form pottant 22A, a conductor to form windings 24A, and a magnetic material to form core 18A.

Many portions of toroidal inductor 10A benefit from being additively manufactured. Additive manufacturing allows for any placement of windings 24A within pottant 22A. The placement of windings 24A may be chosen to facilitate thermal transfer from windings 24A through pottant 22A. Furthermore, additively manufacturing pottant 22A, rather than pouring or injecting a pottant material into an otherwise-complete inductor, allows for the selection of a pottant material that need not be flowable or pourable. Thus, pottant 22A may be selected from a larger category of materials having higher thermal conductivity.

Figure 3:
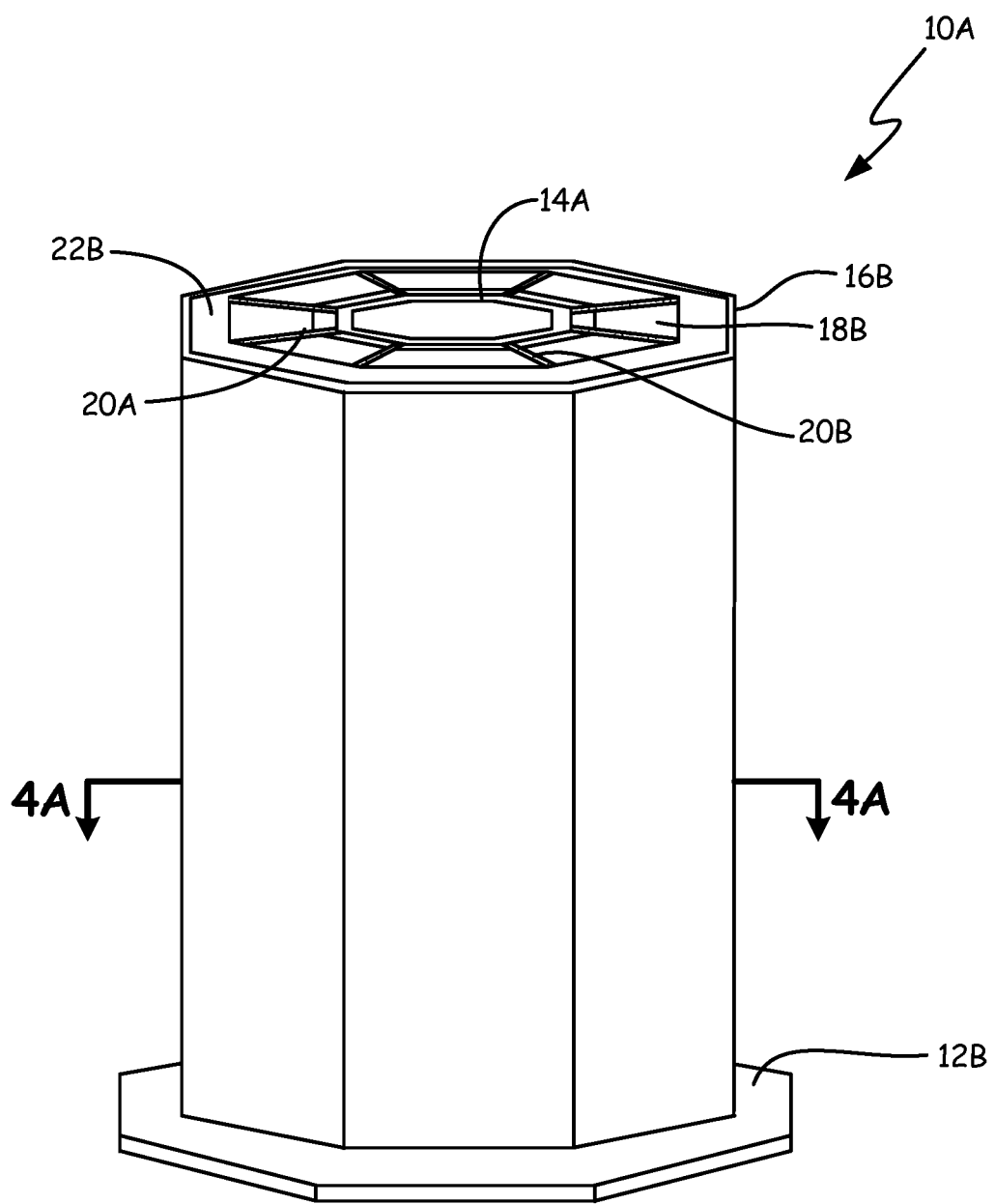
FIG. 3 is a perspective view of an octagonal inductor that is additively manufactured.

FIG. 3 is a perspective view of octagonal inductor 10B. Octagonal inductor 10B is similar to toroidal inductor 1A of FIG. 1, in that it includes base 12B, inner wall 14B, outer wall 16B, cores 18B, gap fillers 20B, and pottant 22B, which are substantially similar in function to their counterparts in toroidal inductor 10A. However, cores 18B of FIG. 3 are shaped as polygons such that, when combined with gap fillers 20B, octagonal inductor 10B has a substantially octagonal cross-sectional profile. Accordingly, inner wall 14B and outer wall 16B are octagonal to contain the octagonal combination of cores 18B gap fillers 20B.

FIG. 3 illustrates just one way in which inductors can be formed that have a non-toroidal shape. In alternative embodiments to those shown in FIGS. 1A and 1B, inductors can be formed having various geometries. For example, hexagonal inductors can be created, or inductors having a polygonal outside wall and a circular inner wall. Because of the process used to form these inductors, described in more detail below, virtually any combination of shapes of inner wall 14B and outer wall 16B is possible.

FIG. 4A is a cross-sectional view of octagonal inductor 10B of FIG. 3, taken along line 4A-4A. Octagonal inductor 10B is similar to toroidal inductor 10A of FIGS. 1 and 2A-2C. However, cores 18B of octagonal inductor 10B are polygonal, so that octagonally shaped inner wall 14B and outer wall 16B circumscribe cores 18B, gap fillers 20B, pottant 22B, and windings 24B.

FIG. 4B is a modified view of octagonal inductor 10B of FIG. 4A, in an unwound state. FIG. 4B shows the insertion of gap fillers 20B being inserted into flat sections 28B along substrate 26B, which includes pottant material 22B and windings 24B. Gap fillers 20B separate each of cores 18B along core layer 32B. Inner layer 34B comprises eight segments 36B, each of which includes pottant material 22B surrounding windings 24B. Unlike toroidal inductor 10A, octagonal inductor 10B does not have arcs 30A (FIG. 2B).

The straight-lined, polygonal shape of cores 18B is simple to manufacture and roll into a loop, as is described in more detail with respect to FIG. 4C. Octagonal inductor 10B can be additively manufactured without a shaped substrate (e.g., base 38A of FIG. 2C).

FIG. 4C illustrates the rolling process for wrapping octagonal inductor 10B into a loop. Starting from the unwound condition shown in FIG. 4B, octagonal inductor 10B is wrapped as indicated by the arrow. As a result of the winding of octagonal inductor 10B, gap fillers 20B are positioned immediately adjacent to both adjacent cores 18B along flat sections 28B. Substrate 26B is bent to approximate an octagonal shape that approximates that of outer wall 16B (FIG. 4A). The rolling method to form wound octagonal inductor 10B can be applied to other embodiments, including toroidal inductor 10A (FIGS. 1, 2A-2C).

Figure 5A:
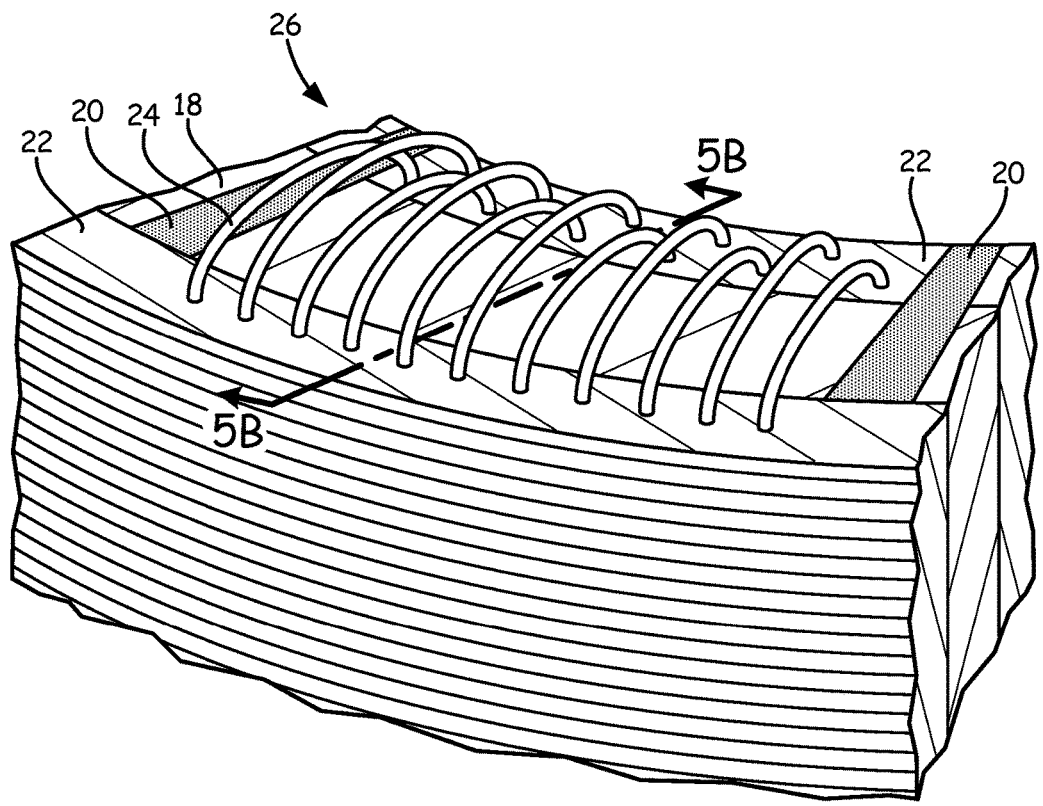
FIG. 5A is a perspective view of an additively manufactured end winding structure.

FIG. 5A is a perspective view of an end winding structure. In the embodiment shown in FIG. 5A, end windings 24 extend from pottant material 22 associated with substrate 26 to pottant material 22 associated with section 36. As will be appreciated by those of skill in the art, end windings 24 interconnect the windings of an inductor coil to generate a magnetic field through core 18. For example, end windings 24 could be used to interconnect windings 24A of FIGS. 1 and 2A-2C, or alternatively to interconnect windings 24B of FIG. 3.

In order to show windings 24, FIG. 5A does not show any material surrounding windings 24. In most embodiments, a pottant surrounds end windings 24, so that end windings 24A can dissipate heat, and also to prevent unwanted electrical contact between adjacent end windings 24.

Figure 5B:
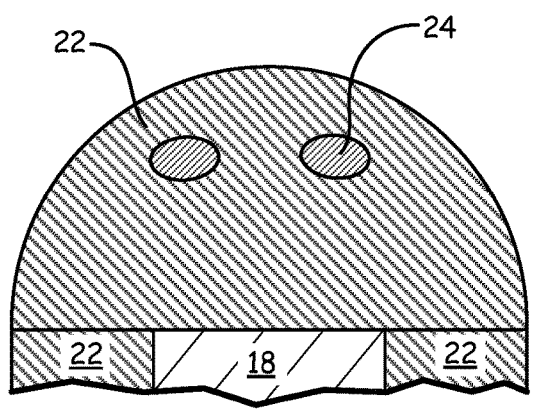
FIG. 5B is a cross-sectional view of the end winding structure of FIG. 5A taken along line 5B-5B.

FIG. 5B is a cross-sectional view of the end winding structure of FIG. 5A, taken along line 5B-5B. In the view shown in FIG. 5B, the surrounding insulating material 22 is shown between end windings 24 (unlike FIG. 5A, in which a portion of insulating material 22 was omitted to more clearly show end windings 24). End windings 24 are arranged at a distance from one another to prevent unwanted electrical contact.

Figure 6:
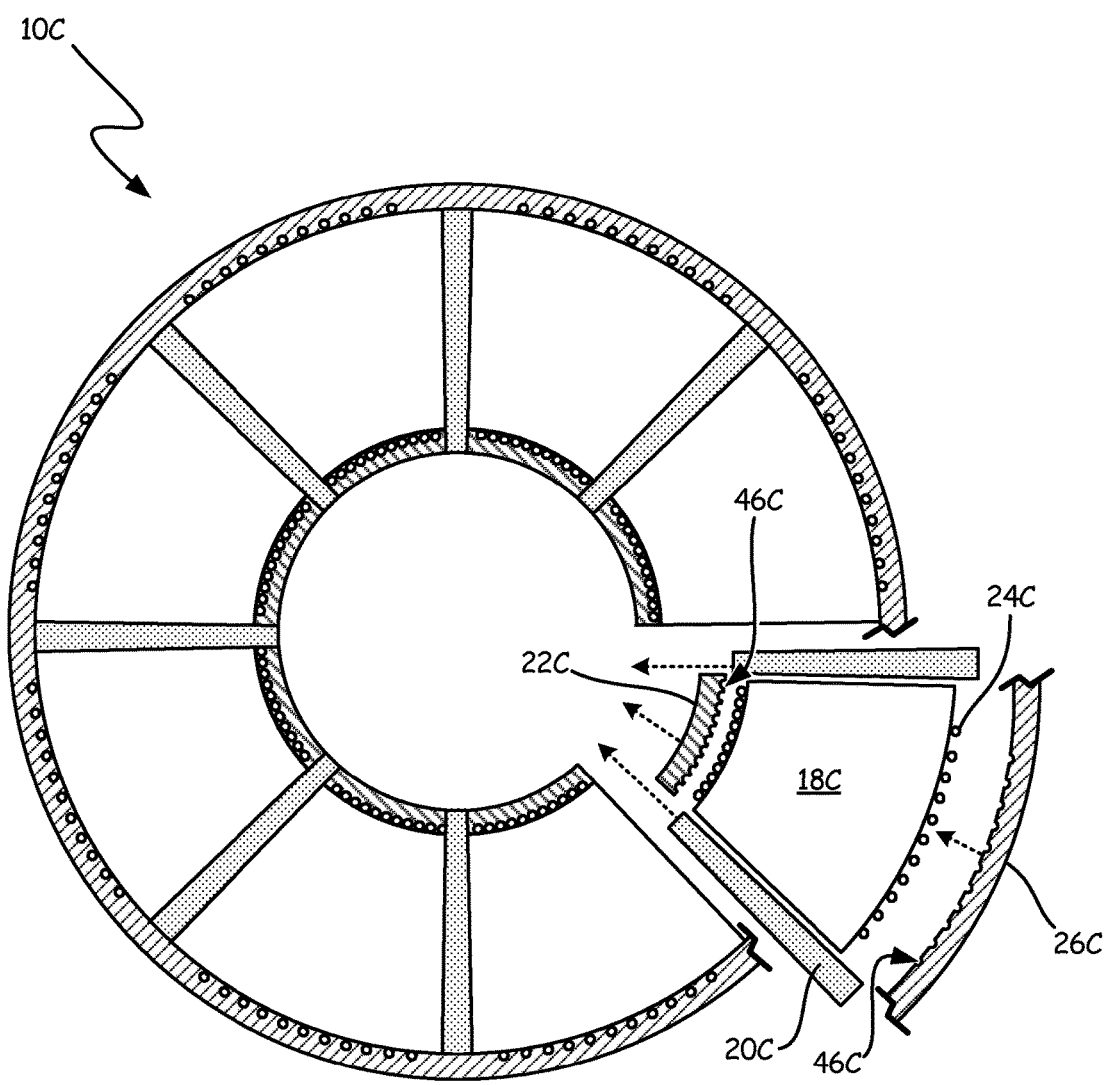
FIG. 6 is an exploded cross-sectional view of a toroidal inductor that is not additively manufactured.

FIG. 6 is an exploded view of inductor 10C, which is not additively manufactured. Inductor 10C includes cores 18C, gap fillers 20C, pottant material 22C, and windings 24C. Substrate 26C is made of pottant material 22C, and includes recesses 46C corresponding to the positions of windings 24C along a radially outer edge of cores 18C. Segments 36C of FIG. 6 include pottant material 22C, which is a high thermal transfer material, arranged along the radially inner distal edge of each of cores 18C. Windings 24C are wrapped around cores 18C manually, for example via an automated winding machine. Recesses 46C are aligned with the positions of windings 24C, so that efficient thermal transfer is accomplished.

Pottant material 22C is arranged along both radially inner and outer distal ends of cores 18C. Substrate 26C is wrapped about the outer radial end of core 18C using the rolling technique discussed previously with respect to FIG. 4C. Cores 18C are pre-wrapped with windings 24C, and the resulting structure is placed onto substrate 26C, aligned with recesses 46C. Segments 36C are placed on a radially inner edge of cores 18C. Each of segments 36C also includes recesses 46C, which are aligned to snugly fit with windings 24C, as shown in the exploded view.

Because pottant material 22C is pre-formed to mate with windings 24C surrounding cores 18C, pottant material 22C need not be flowable or pourable. Thus, pottant material 22C may be selected from materials having high thermal conductivity without regard to rheological characteristics such as pourability or flowability. For example, the thermal conductivity of pottant material 22C may exceed 17 W/m-K.

Figure 7A:
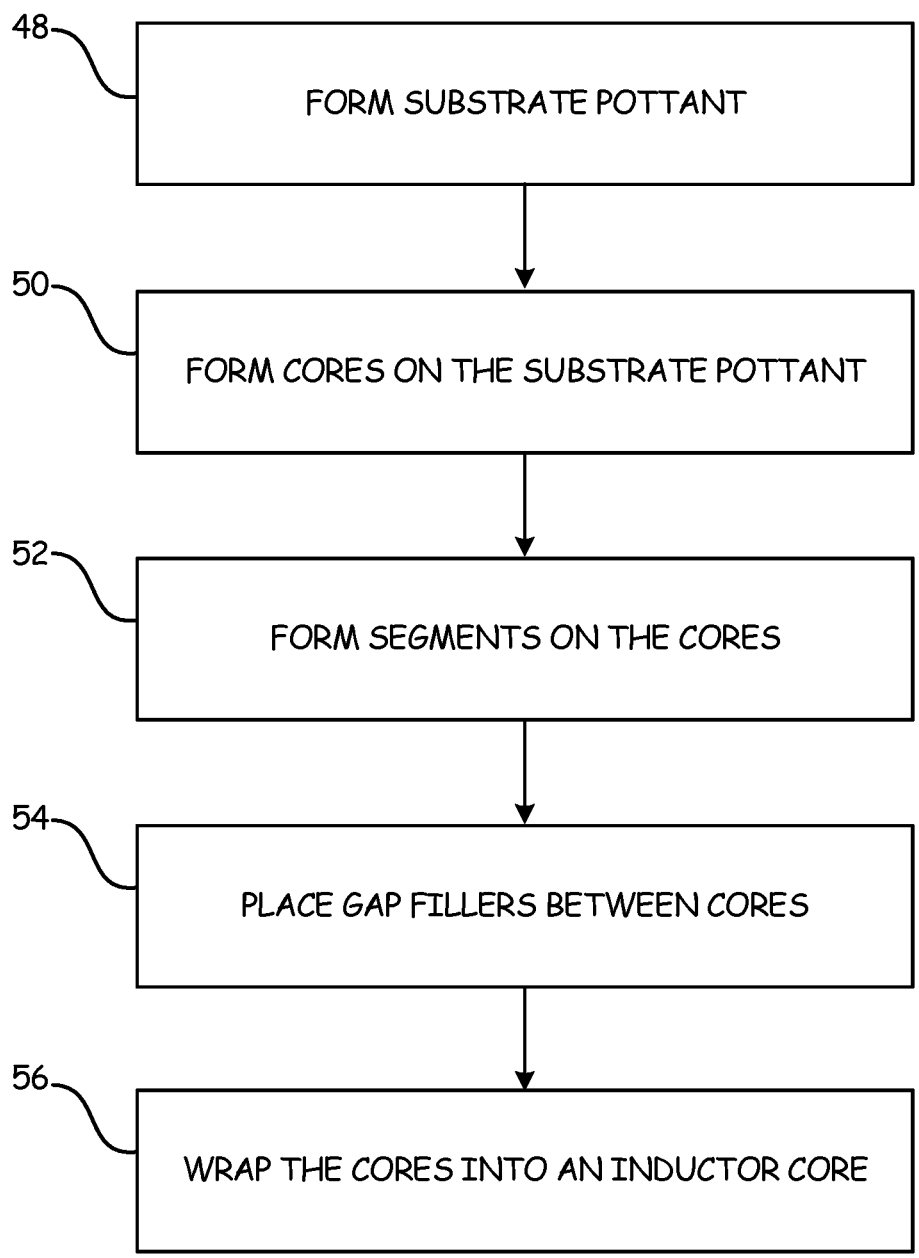
FIGS. 7A-7B are flowcharts illustrating methods of creating an inductor core.

FIG. 7A is a method of forming an inductor. According to the method of FIG. 7A, an inductor is made using additive manufacturing.

At step 48, a substrate pottant is formed. The substrate pottant is made of a material with a high coefficient of thermal conductivity. In one embodiment, the coefficient of thermal conductivity exceeds 17 W/m-K. The substrate pottant includes windings, which are embedded within the pottant. The substrate can be formed by additive manufacturing to allow for placement of the windings directly in the pottant material. In this way, heat may be efficiently transferred from the windings. The substrate pottant may be curved (e.g., substrate 26A of FIG. 2B), flat (e.g., substrate 26B of FIG. 3B), or any other desired geometry to fit within an outer wall of a housing of the inductor when rolled into a loop.

At step 50, cores are formed on the substrate. Cores are typically made of a magnetic material. The cores may also be additively manufactured. The cores are spaced from one another along the substrate by a flat portion.

At step 52, segments are formed on the cores. The segments are made of pottant material containing built-in windings, much like the substrate. The segments are arranged along an opposite edge of each of the cores from the substrate. One segment is formed on each of the cores.

At step 54, gap fillers are placed between each of the cores. The gap fillers are placed on the flat sections of the substrate, in between each adjacent pair of cores. The gap fillers are formed of an insulating material, and may be manually placed, rather than additively manufactured.

At step 56, the cores are wrapped into an inductor coil. The inductor coil is full loop of cores separated by gap fillers. Around the outside edge of the loop is the substrate, and along the inner edge are the segments separated by gap fillers. Optionally, the wrapped inductor coil can be inserted between an inner wall and an outer wall.

Figure 7B:
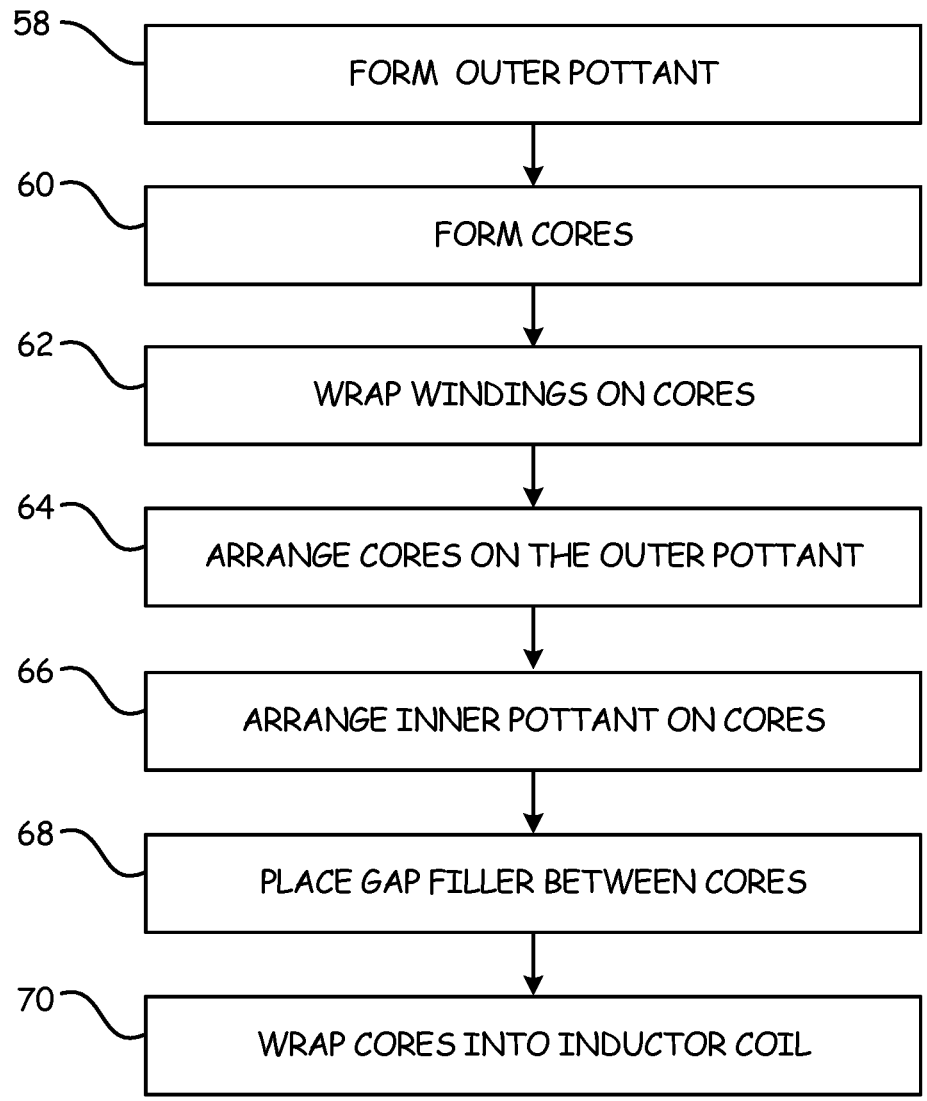

FIG. 7B is a flowchart for a method of forming an inductor core. The method shown in FIG. 5B need not include using additive manufacturing to form the components.

At step 58, an outer pottant is formed. The outer pottant need not include windings, but may include recesses configured to receive windings on an adjacent component, as described in more detail below. The pottant is formed from a material having a high coefficient of thermal transfer.

At step 60, cores are formed. The cores are made of a magnetic material.

At step 62, windings are wrapped on to the cores. Typically, there are multiple windings on each core. The windings are wrapped such that when current is driven through the windings, a magnetic field is generated in the magnetic material that makes up the cores. The windings around each core may be electrically connected to one another. For example, where the desired inductor is driven by a single phase DC voltage source, all of the windings may be electrically connected to one another. In alternative embodiments, such as those for inductors driven by multi-phase power sources, subsets of the windings may be electrically connected to one another, but not connected to the windings of other cores.

At step 64, the cores are arranged on the outer pottant. The recesses of the outer pottant are aligned to engage with the windings surrounding the cores. In this way, heat can be efficiently dissipated from the windings via the outer pottant.

At step 66, inner pottant is arranged on the cores. Much like the outer pottant, the inner pottant is formed into a shape that includes recesses configured to engage with a portion of the windings surrounding the cores.

At step 68, gap fillers are placed between the cores. The gap fillers are typically formed of an insulating material. The gap fillers and the cores combine to substantially cover one surface of the outer pottant material.

At step 70, the cores are wrapped into an inductor coil. When wrapped, the cores and the segments abut the gap fillers. Furthermore, the wrapped inductor coil is configured to fit between an outer wall and an inner wall of an inductor housing. The wrapped inductor coil is a closed loop, and may have a toroidal or octagonal cross-section.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An apparatus comprising:
   a substrate layer formed from a pottant material that extends longitudinally in an unwound state;
   a plurality of cores spaced longitudinally along the substrate layer, each core having a first surface joined to the substrate layer and a second surface opposite the first surface; and
   a plurality of segments formed from the pottant material, wherein each of the plurality of segments is joined to one of the plurality of cores along the second surface of the core.

2. The apparatus of claim 1, and further comprising:
   a first plurality of windings embedded within the substrate layer; and
   a second plurality of windings embedded within the plurality of segments;
   wherein the first and second pluralities of windings are arranged in groups, each group of first and second pluralities of windings associated with one of the plurality of cores.

3. The apparatus of claim 2, and further comprising:
   a plurality of end windings electrically connecting the first plurality of windings to the second plurality of windings.

4. The apparatus of claim 1, and further comprising:
   a plurality of gap fillers, each gap filler disposed between adjacent cores and composed of a dielectric material.

5. The apparatus of claim 4, wherein the plurality of gap fillers abut the plurality of cores and the plurality of segments in a wound state to form a loop.

6. The apparatus of claim 4, wherein the substrate layer comprises:
   a plurality of arc portions; and
   a plurality of flat portions interposed between adjacent arc portions.

7. The apparatus of claim 6, wherein each of the plurality of cores mates with one of the plurality of arc portions, and wherein each of the plurality of gap fillers mates with one of the flat portions.

8. The apparatus of claim 1, wherein each of the plurality of cores has third and fourth surfaces extending from the first surface to the second surface, and wherein the third surface is angled towards the fourth surface at the second surface.

9. The apparatus of claim 8, wherein an included angle between the third and fourth surface of each core is substantially equal, the sum of the included angles being substantially equal to 360 degrees.

10. The apparatus of claim 1, wherein each of the plurality of cores has a polygonal shape.

11. The apparatus of claim 1, wherein the first surface is defined by a first radius, and the second surface is defined by a second radius concentric with the first radius.

* * * * *